L. O. SLOGGETT.
PLUMB BOB.
APPLICATION FILED JUNE 2, 1908.
928,477.
Patented July 20, 1909.
2 SHEETS—SHEET 1.
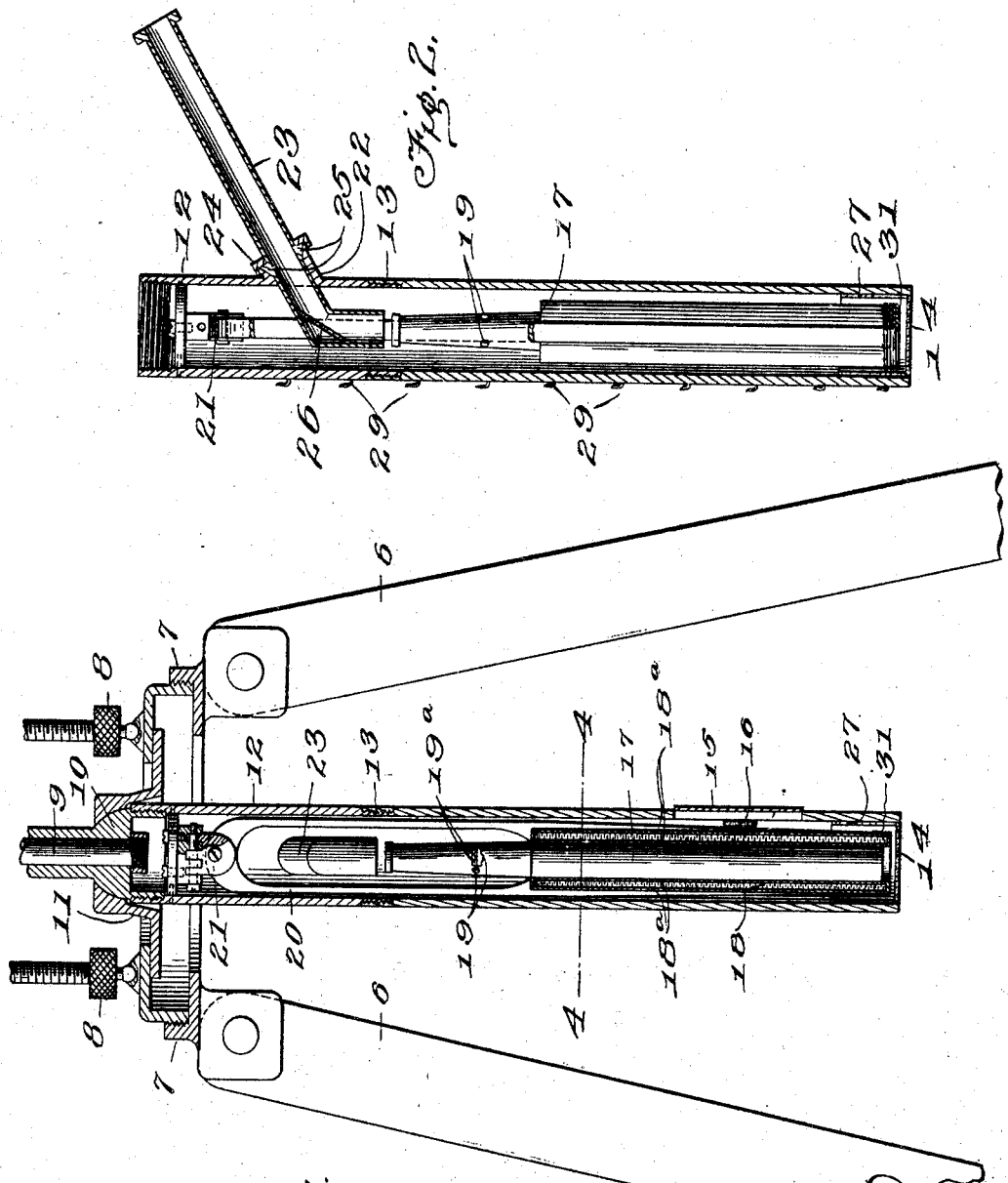
WITNESSES:
Geo. L. Thom
M. L. Morton
INVENTOR
L. O. Sloggett.
BY
Geo. E. Tew
Attorney

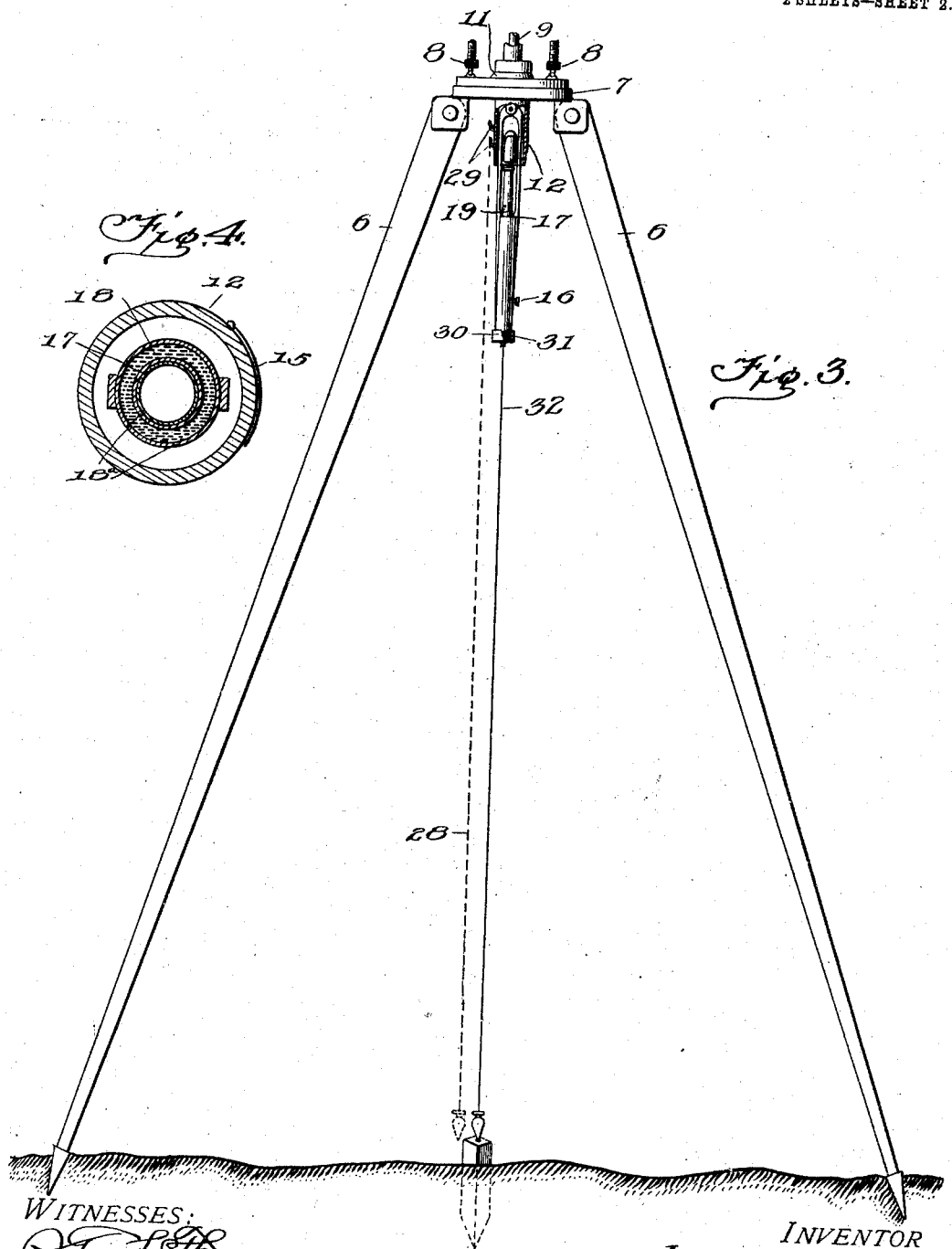

UNITED STATES PATENT OFFICE.

LOUIS O. SLOGGETT, OF CHICAGO, ILLINOIS.

PLUMB-BOB.

No. 928,477.  Specification of Letters Patent.  Patented July 20, 1909.

Application filed June 2, 1908. Serial No. 436,272.

*To all whom it may concern:*

Be it known that I, LOUIS O. SLOGGETT, citizen of the United States, residing at Chicago, in the county of Cook and State of Illinois, have invented certain new and useful Improvements in Plumb-Bobs, of which the following is a specification.

This invention is a plumb-bob particularly adapted and intended for use in connection with transits, theodolites and similar instruments, and has for its object to provide a plumb-bob which will be held in a casing out of the wind, and which accordingly will not be affected by the wind.

The device includes a telescope which is held in vertical position at the axis of the instrument, and through which the spot over which the instrument is to be set can be seen, conveniently by means of an angular sight tube provided with a mirror which reflects the image in the line of sight of the telescope. A finder is also provided for use in connection with the telescopic plumb-bob, as well as means for adjustment to be hereinafter described.

In the drawings, Figure 1 is a vertical section showing the parts at the head of a tripod. Fig. 2 is a vertical section at a right angle to Fig. 1 of the plumb-bob proper. Fig. 3 is a side elevation, partly in section, illustrating the use of the finder and also showing the means for adjusting the cross-hairs of the telescope. Fig. 4 is a section on the line 4—4 of Fig. 1.

Referring specifically to the drawings, the legs of the tripod are indicated at 6 supporting the usual lower plate 7 on which the leveling screws 8 which support the transit or other instrument are mounted, in the usual manner. The spindle of the transit or other instrument is indicated at 9 supporting the half ball 10 of the instrument which fits in a socket in the shift plate 11.

The tubular brass casing 12 is threaded to the ball and forms the shell which contains the bob. This casing is made in two parts screwed together at 13 so that the lower part of the shell may be removed. The lower end of the shell is closed by a plain, flat glass 14, and the shell has a thin spring metal door 15 permitting access to the adjusting screw 16 of the telescope, the barrel of which is indicated at 17. The tube or barrel of the telescope is made with concentric double walls with a symmetrical annular space 18 therebetween, and said space will be filled with lead or mercury. The telescope will be provided with the usual cross-hairs or wires 19ª adjusted by capstan screws 19.

The telescope is supported in position within the shell 12 by means of a looped hanger 20 connected by a universal joint at 21 with the upper end of the shell, permitting the telescope to oscillate in the shell in all directions. The shell has an opening or nipple at one side, as indicated at 22, to receive a sighting tube 23 held in by a screw cap 24, the tube being coned, as at 25, where it fits in the nipple. The inner end of the sight tube is bent in line with the telescope and is provided at the elbow with a mirror 26 which reflects the image from the telescope through the tube. At the lower end the shell has within the same a ring of leather 27 which acts as a buffer to prevent injury by pounding incident to the telescope swinging against the shell.

The finder attachment consists of an ordinary plumb bob 28 the string of which may be attached to any one of a series of hooks 29 on the outside of the shell 12. The plumb-bob can be quickly attached to the appropriate hook according to the height of the tripod, and it will locate the spot over which the instrument is to be set sufficiently near to enable the telescope to be sighted thereon. This saves considerable time which would otherwise be necessary to find the spot with the telescope.

Fig. 3 shows how the cross-hairs of the telescope may be adjusted. First, the lower portion of the shell is unscrewed at 13 and removed. A screw cap 30 is then screwed on the lower end of the telescope barrel, which is threaded, as at 31, for the purpose. An ordinary plumb-bob 32 is connected to the cap at the center thereof, in line with the axis of the telescope, and the plumb-bob is set directly over a point or spot. The cap 30 and plumb-bob 32 are then removed, after which the screws 19 may be turned, if necessary, to adjust the cross-hairs exactly in line with the spot. The removal of the shell allows free access to the adjusting screws.

In use, the instrument will be approximated to the spot by means of the finder 28, and then by sighting into the tube 23 and thus through the telescope the instrument can be readily adjusted to bring the axis of the telescope and the center of the instrument directly over the desired spot. Inasmuch as the weighted telescope is contained within the casing 12, it cannot be affected by wind, and hence the spot from which the measurement of observation is taken can be very exactly located and the instrument will be free from the inaccuracies arising from the use of an ordinary plumb-bob.

Various modifications may be made in the structure within the scope of the invention, and no limitation is implied by reason of the particular form shown.

I claim:

1. A plumb-bob comprising a casing, a telescope hung therein for oscillation in all directions, and a sight tube extending into the casing at an angle to the telescope and having a mirror in line with the telescope.

2. A plumb-bob comprising a closed tubular casing, a telescope therein provided with a weight at its lower end and suspended at its upper end for free oscillation, and a sight tube supported in position with one end thereof in line with the upper end of the telescope.

3. A plumb-bob comprising a tubular casing, a telescope therein weighted at its lower end and hung at its upper end for free oscillation, and a bent sight tube projecting through the side of the casing and having its inner end in line with the telescope, and provided with a mirror at the bend to reflect the image to the outer end of the tube.

4. A plumb-bob comprising a telescope weighted at its lower end and suspended in vertical position for free oscillation, with its objective directed downwardly, and laterally-extending means to sight through the telescope.

5. The combination with a support, of a plumb-bob comprising a telescope suspended in vertical position therefrom for free oscillation and weighted at its lower end, and a tubular casing surrounding the telescope and fixed at its upper end to the support and formed in sections separable to permit access to the telescope.

6. The combination with a telescope suspended in vertical position for free oscillation, with its objective directed downwardly, of a symmetrical weight extending around the lower end thereof.

7. A plumb-bob comprising a telescope suspended in vertical position for free oscillation, with its objective directed downwardly, the telescope having concentric double walls at its lower end forming a symmetrical annular space, and weight material in said space.

8. The combination with a support, of a plumb-bob comprising a telescope in vertical position weighted at its lower end, a hanger connected at its lower end to the telescope and projecting above the upper end thereof, a universal joint between the upper end of the hanger and the support, and a sighting tube extending angularly and registering at its inner end with the telescope, and provided with a reflector.

9. The combination of a plumb-bob including a telescope adapted to be directed toward a spot desired, and a finder-bob suspended beside the telescope, substantially as described.

10. The combination of a plumb-bob including a vertically-hanging telescope adapted to be directed toward a desired spot, a wind-shield surrounding the telescope, and a finder bob attached to the shield and depending therefrom.

11. A plumb-bob comprising a telescope suspended in vertical position for free oscillation with its objective directed downwardly, and weighted at its lower end, and provided with cross-hairs and adjusting devices therefor.

12. The combination with a tripod and a surveying instrument having a vertical axis, of a plumb-bob comprising a telescope weighted at its lower end and suspended in vertical position from the support with its axis in alinement with that of the instrument, and with its objective directed downwardly, and means to sight through the telescope from the side.

In testimony whereof I affix my signature, in presence of two witnesses.

LOUIS O. SLOGGETT.

Witnesses:
RICHARD MURRA,
ISAIAH CAMPBELL.